United States Patent
Bushmire et al.

(10) Patent No.: US 10,048,103 B2
(45) Date of Patent: Aug. 14, 2018

(54) ADJUSTABLE POSITION PITOT PROBE MOUNT

(71) Applicant: Bell Helicopter Textron Inc., Fort Worth, TX (US)

(72) Inventors: Troy Thomas Bushmire, Saginaw, TX (US); David Bryan Roberts, Bedford, TX (US); Brad John Roberts, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 21 days.

(21) Appl. No.: 15/273,762

(22) Filed: Sep. 23, 2016

(65) Prior Publication Data
US 2018/0087940 A1    Mar. 29, 2018

(51) Int. Cl.
*G01F 1/46*    (2006.01)
*G01F 15/18*    (2006.01)

(52) U.S. Cl.
CPC .............. *G01F 1/46* (2013.01); *G01F 15/185* (2013.01)

(58) Field of Classification Search
CPC ......... B64D 43/02; G01F 1/46; G01F 15/006; G01F 15/005; G01F 15/14; Y10T 29/49826; Y10T 29/49419; Y10T 29/49885; B23P 15/001; G01P 13/025; G01P 5/165
See application file for complete search history.

(56) References Cited

U.S. PATENT DOCUMENTS

| | | | | |
|---|---|---|---|---|
| 4,271,700 A | * | 6/1981 | Tschanz | G01P 5/165 |
| | | | | 73/182 |
| 5,544,526 A | * | 8/1996 | Baltins | G01P 5/165 |
| | | | | 73/180 |
| 6,941,805 B2 | * | 9/2005 | Seidel | B64D 43/02 |
| | | | | 73/170.02 |
| 8,234,935 B2 | | 8/2012 | Kamp et al. | |
| 9,175,991 B2 | | 11/2015 | Kamp et al. | |
| 9,574,963 B2 | * | 2/2017 | Robert | G01P 5/16 |
| 9,702,783 B2 | * | 7/2017 | DeAngelo | G01M 3/40 |
| 2006/0086184 A1 | * | 4/2006 | Collot | B64D 43/02 |
| | | | | 73/186 |

* cited by examiner

*Primary Examiner* — Harshad R Patel
*Assistant Examiner* — Brandi Hopkins
(74) *Attorney, Agent, or Firm* — Edwin S. Flores; Daniel J. Chalker; Chalker Flores, LLP

(57) ABSTRACT

The present invention includes an adjustable Pitot tube and method for using the same for operating or flight testing an aircraft comprising: a Pitot probe; a streamline tube connected to the Pitot probe; a mount on the aircraft connected to the streamline tube, wherein the streamline tube can at least one of rotate about an axis of the mount, or the streamline tube can move the Pitot probe closer to, or away from, a skin of the aircraft.

19 Claims, 12 Drawing Sheets

ADJUSTABLE POSITION PITOT PROBE MOUNT

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of aircraft sensors, and more particularly, to attachment/adjustment of airspeed sensors.

BACKGROUND OF THE INVENTION

Without limiting the scope of the invention, its background is described in connection with aircraft sensors.

U.S. Pat. No. 9,175,991, issued to Kamp, is entitled, "Method of forming a Pitot tube valve assembly with an anti-rotation mechanism", and is said to teach a valve assembly that includes a Pitot tube having an angled tip to extract from a duct formed by a housing a sample of a fluid to be communicated to an actuator configured to operate the duct, with the Pitot tube being disposed within the housing whereby the Pitot tube is fixed longitudinally between the actuator and the housing and laterally within the housing and an anti-rotation mechanism coupled with the Pitot tube to rotationally secure the Pitot tube such that the angled tip is fixed to face rearwardly.

U.S. Pat. No. 8,234,935, also issued to Kamp, et al., is entitled "Anti-rotation mechanism for Pitot tube" and is said to teach a valve assembly that includes a Pitot tube having an angled tip to extract from a duct formed by a housing a sample of a fluid to be communicated to an actuator configured to operate the duct, the Pitot tube being disposed within the housing whereby the Pitot tube is fixed longitudinally between the actuator and the housing and laterally within the housing and an anti-rotation mechanism coupled with the Pitot tube to rotationally secure the Pitot tube such that the angled tip is fixed to face rearwardly.

SUMMARY OF THE INVENTION

In one embodiment, the present invention includes an adjustable Pitot tube for an aircraft comprising: a Pitot probe; a streamline tube connected to the Pitot probe; a mount on the aircraft connected to the streamline tube, wherein the streamline tube can: rotate about an axis of the mount, or the streamline tube can move the Pitot probe closer to, or away from, a skin of the aircraft. In one aspect, the Pitot probe is a simple Pitot tube, a static source, or a Pitot-static tube. In another aspect, the mount comprises a plurality of openings that permit rotation of the mount along a longitudinal axis of the streamline tube. In another aspect, the mount comprises a generally spherical mount that permits movement of the streamline tube in at least two-dimensions. In another aspect, the streamline tube is connected to an actuator that is capable of linearly translating the streamline tube along a longitudinal axis of the streamline tube. In another aspect, the mount comprises a generally spherical mount that is connected to one or more actuators, wherein each of the one or more actuators provides rotational of the spherical mount in at least one dimension. In another aspect, the Pitot tube further comprises a heater or a coating that prevents ice formation. In another aspect, the position of the Pitot tube in at least two dimensions is controlled by a computer that is connected to one or more actuators that rotate the streamline tube about its longitudinal axis, or linearly translates the streamline tube along its longitudinal axis. In another aspect, the position of the Pitot tube in at least three dimensions is controlled by a computer that is connected to two or more actuators that rotate the streamline tube about its longitudinal axis, linearly translates the streamline tube along its longitudinal axis, or change the angle the Pitot tube relative to a surface of the aircraft. In another aspect, the aircraft is a fixed-wing aircraft, a helicopter or a rotorcraft. In another aspect, the position of the Pitot tube in at least two or three-dimensions is controlled manually or automatically.

In another embodiment, the present invention includes a method of positioning a Pitot tube comprising: connecting a Pitot probe to an adjustable streamline tube; and mounting the streamline tube to a mount on an aircraft, wherein the streamline tube can at least one of rotate about an axis of the mount, or the streamline tube can move the Pitot probe closer to, or away from, a skin of the aircraft. In one aspect, the mount is a two degrees of freedom adjustable mount and manually adjusting the rotation or linear position of the streamline tube in relation to the aircraft, e.g., on the fuselage. In another aspect, the method further comprises the step of manually adjusting the position of a Pitot tube or the Pitot probe in two degrees of freedom during a flight test phase of a program to determine and fine tune the optimal position for the Pitot tube. In another aspect, the mount is a multi-degrees of freedom adjustable mount and manually adjusting the rotation or linear position of the streamline tube in relation to the aircraft, e.g., on the aircraft fuselage. In another aspect, the method further comprises the step of manually adjusting the position of a Pitot tube or the Pitot probe in multi-degrees of freedom during a flight test phase of a program to determine and fine tune the optimal position for the Pitot tube. In another aspect, the mount is a multi-degrees of freedom adjustable mount and automatically adjusting the rotation or linear position of the streamline tube in relation to the aircraft. In another aspect, the method further comprises the step of automatically adjusting the position of a Pitot tube or the Pitot probe in multi-degrees of freedom during a flight test phase of a program to determine and fine tune the optimal position for the Pitot tube. In another aspect, the mount is a multi-degrees of freedom adjustable mount is connected to two or more actuators that are connected to a computer, wherein the computer automatically adjusts the angle, rotation, or linear position of the streamline tube in relation to the aircraft in real time during aircraft operations. In another aspect, the method further comprises the step of automatically adjusting the position of a Pitot tube or the Pitot probe in multi-degrees of freedom using two or more actuators connected to a computer, wherein the computer changes the angle, rotation, or linear position for the Pitot tube in real time during aircraft operations.

In yet another embodiment, the present invention includes an adjustable Pitot tube for an aircraft comprising: a Pitot probe; a streamline tube connected to the Pitot probe; a mount on the aircraft connected to the streamline tube; one or more actuators connected to the streamline tube or the mount, wherein the streamline tube and/or the mount can: rotate about an axis of the mount, or the streamline tube can move the Pitot probe closer to, or away from, a skin of the aircraft using the one or more actuators.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
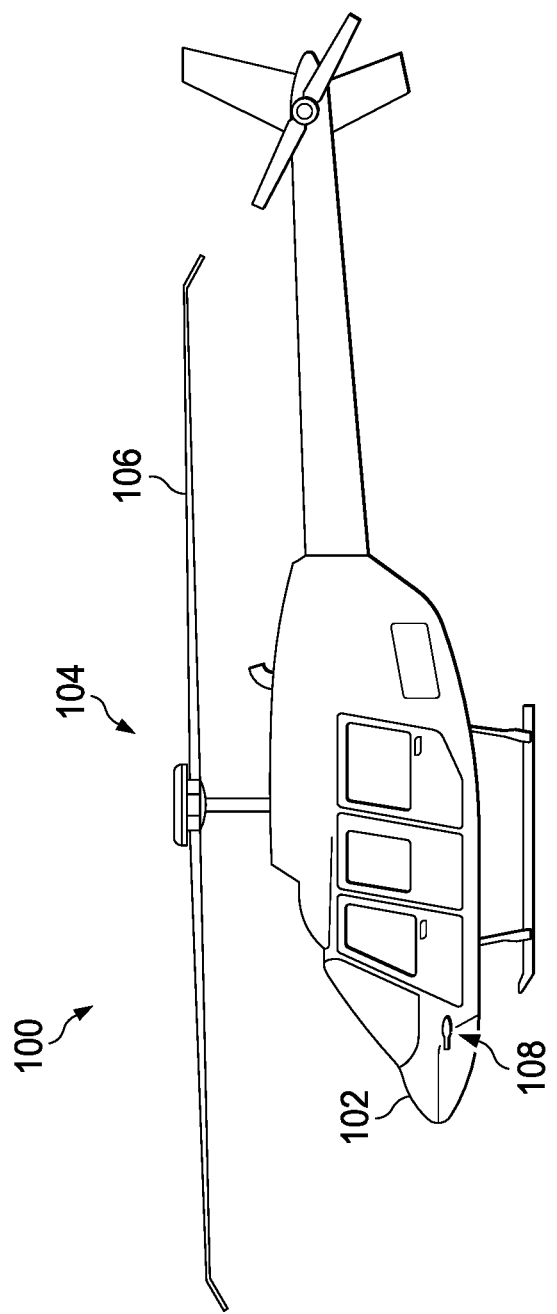
FIG. 1 shows a side view of a helicopter for use of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the term "degrees of freedom" or "DOF" refers to the minimum number of independent coordinates that are used to specify the position of a component in a system in one, two, or three dimensions. When used with regard to an aircraft, a total of six degrees of freedom are typically described as vertical, lateral, and longitudinal forces, and roll, pitch, and yaw moments.

The present invention is an adjustable position Pitot tube, which includes a Pitot probe, an adjustable streamline tube, and an adjustable mount that allows for quick configuration changes to Pitot, or Pitot-static, probe orientation. The advantage of this design over a conventional fixed mount is that it allows the probe orientation to be adjusted to a more favorable position during, e.g., a flight-test with very minimal impact to schedule or during aircraft operations. The present invention results in quicker calibration of the sensors as well as providing an optimally corrected air data system.

The self-optimizing adjustable position Pitot mount of the present invention can include a telescoping feature (allowing the sensor to be moved in and out with respect to the aircraft) and a rotational feature (allowing the sensor's angle with respect to the oncoming flow to be adjusted) to relocate the sensor during flight test to its optimal position, and even change an angle in relation to the aircraft, e.g., the aircraft fuselage, wings, or other surfaces. There are different methods in which this can be achieved using the present invention. The first method allows for adjustability in two degrees of freedom, that is one degree of translation (in and out with respect to the aircraft) and one DOF rotation (about the line of translation). The linear translation is achieved by a telescoping feature that can be as simple as mechanically fastening the desired length of streamlined tube to a base plate, or as complex as utilizing dials for large or fine-tuning adjustments. The rotation is achieved by slotted holes in the base plate that allow the entire base to rotate until the attachment fasteners are torqued down. The second method allows for adjustments in all directions, which is achieved by a spherical attachment to the aircraft along with a telescoping feature. The spherical attachment would allow for rotation in all directions. A telescoping feature allows for the sensor to be move in/out with respect to the aircraft. By combining the telescoping feature with spherical feature any orientation of the Pitot probe can be achieved (within the limits of the two respective features).

Prior methods used analysis to predict the Pitot mount locations. Then, through flight test trial and error create a new air data system for each iteration. This is an expensive and time consuming process. Being able to adjust the Pitot tube stand off distance and alignment angles allows for the optimum air data system to be found in days rather than months. The present invention can be used on both fixed winged and rotorcraft prototypes in flight-test applications and final production models. Generally, the present invention will find particular uses in any aircraft (fixed-wing, rotorcraft, or helicopter) undergoing initial flight testing.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
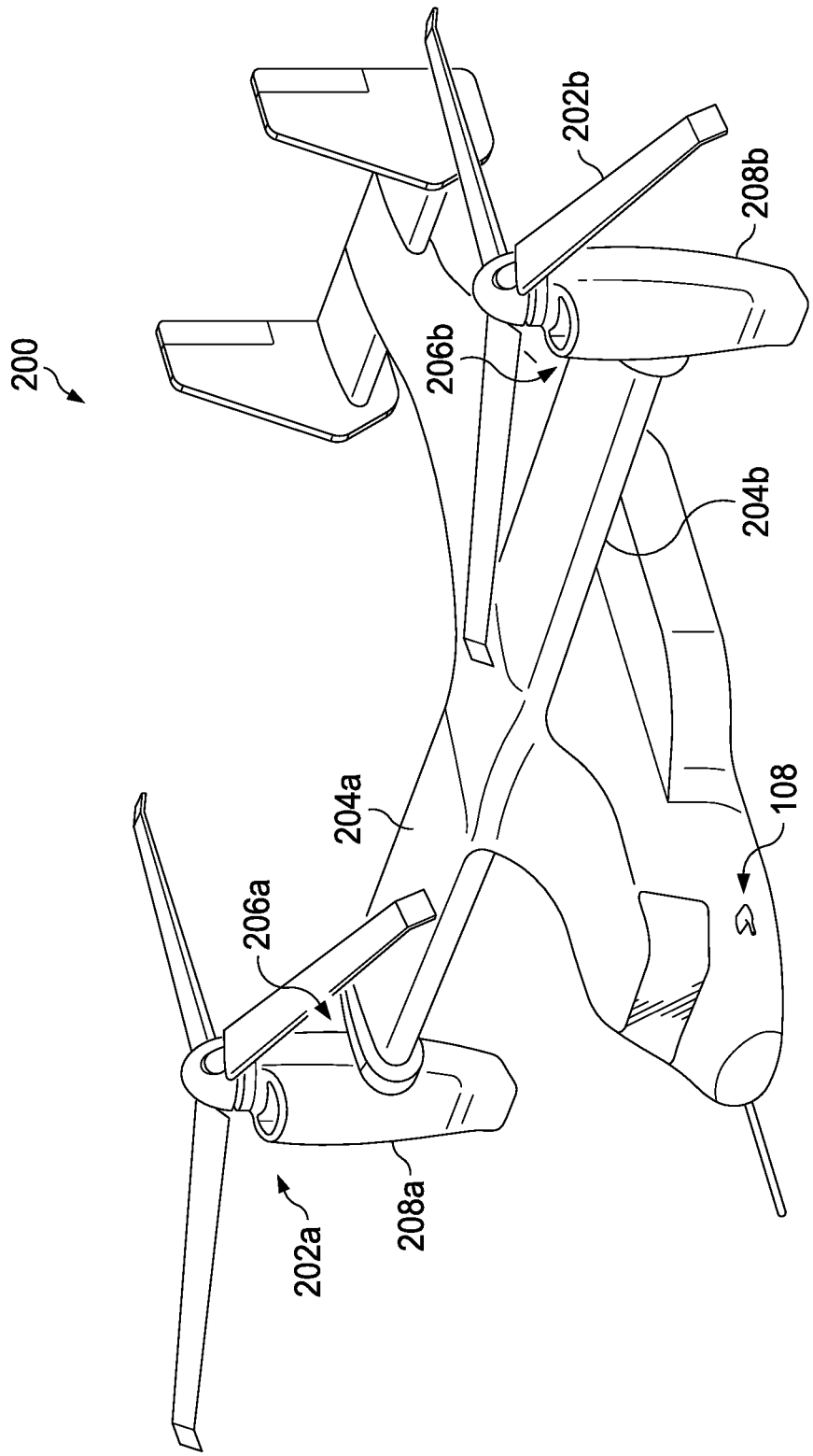
FIG. 2A shows a perspective view of tiltrotor aircraft that can use the present invention.

For example, FIG. 2A shows a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tilt rotor aircraft 200. Tilt rotor assemblies 202a and 202b move or rotate relative to wing members 204a and 204b between a helicopter or hover mode in which tilt rotor assemblies 202a and 208b are tilted upward, such that tilt rotor aircraft 200 flies like a conventional helicopter; and an airplane or cruise mode in which tilt rotor assemblies 202a and 208b are tilted forward, such that tilt rotor aircraft 200 flies like a conventional propeller driven aircraft.

Figure 2B:
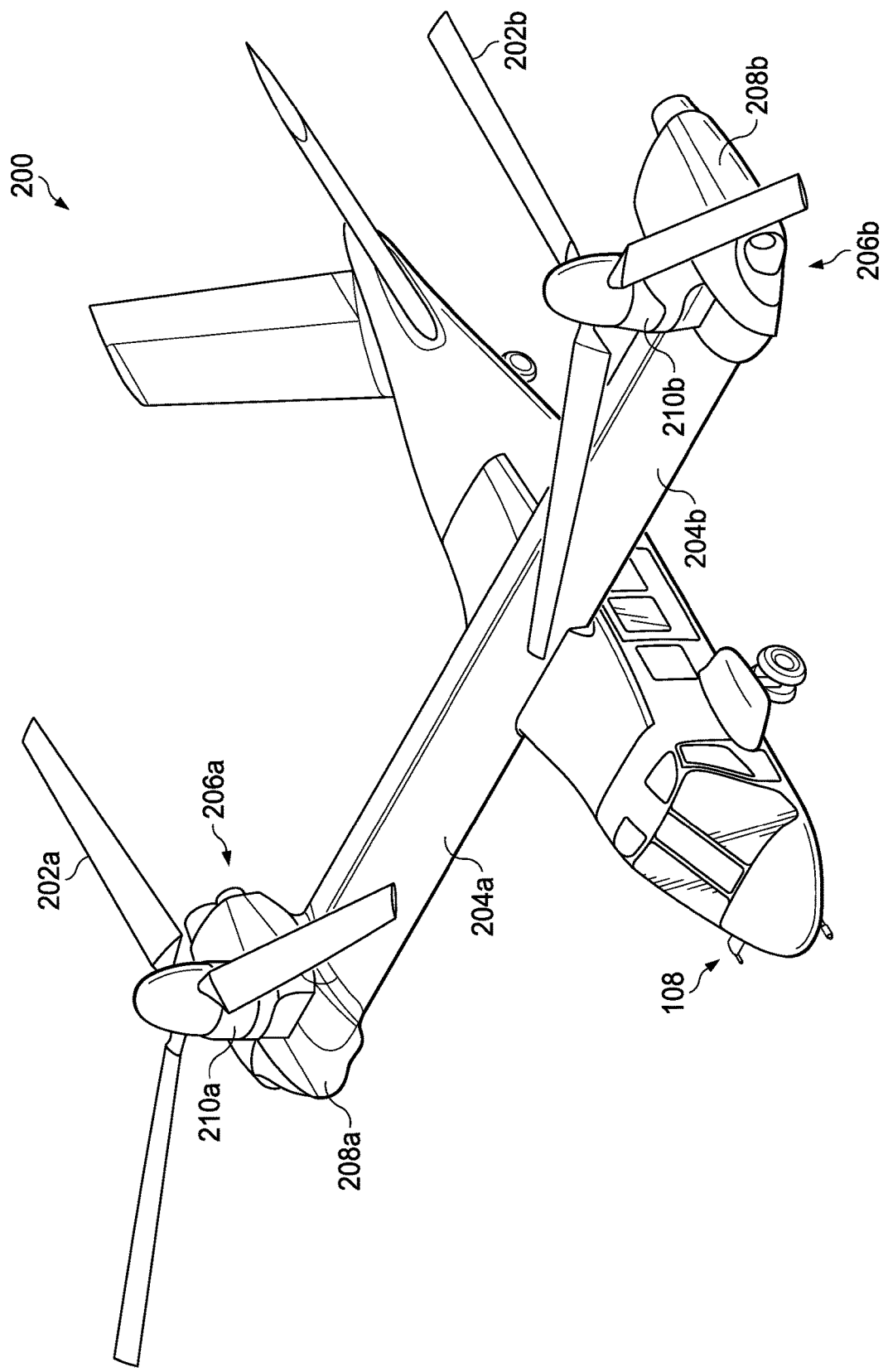
FIG. 2B shows another perspective view of tiltrotor aircraft that can use the present invention.

FIG. 2B shows another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons 210a and 210b with the rotor assemblies 202a and 202b rotates. Tilt rotor assemblies 202a and 202b move and rotate relative to wing members 204a and 204b and the nacelles 208a and 208b. The tilt rotor assemblies 202a and 202b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which on the rotors are tilted forward, such that tilt rotor aircraft 200 flies like a conventional propeller driven aircraft.

Figure 2C:
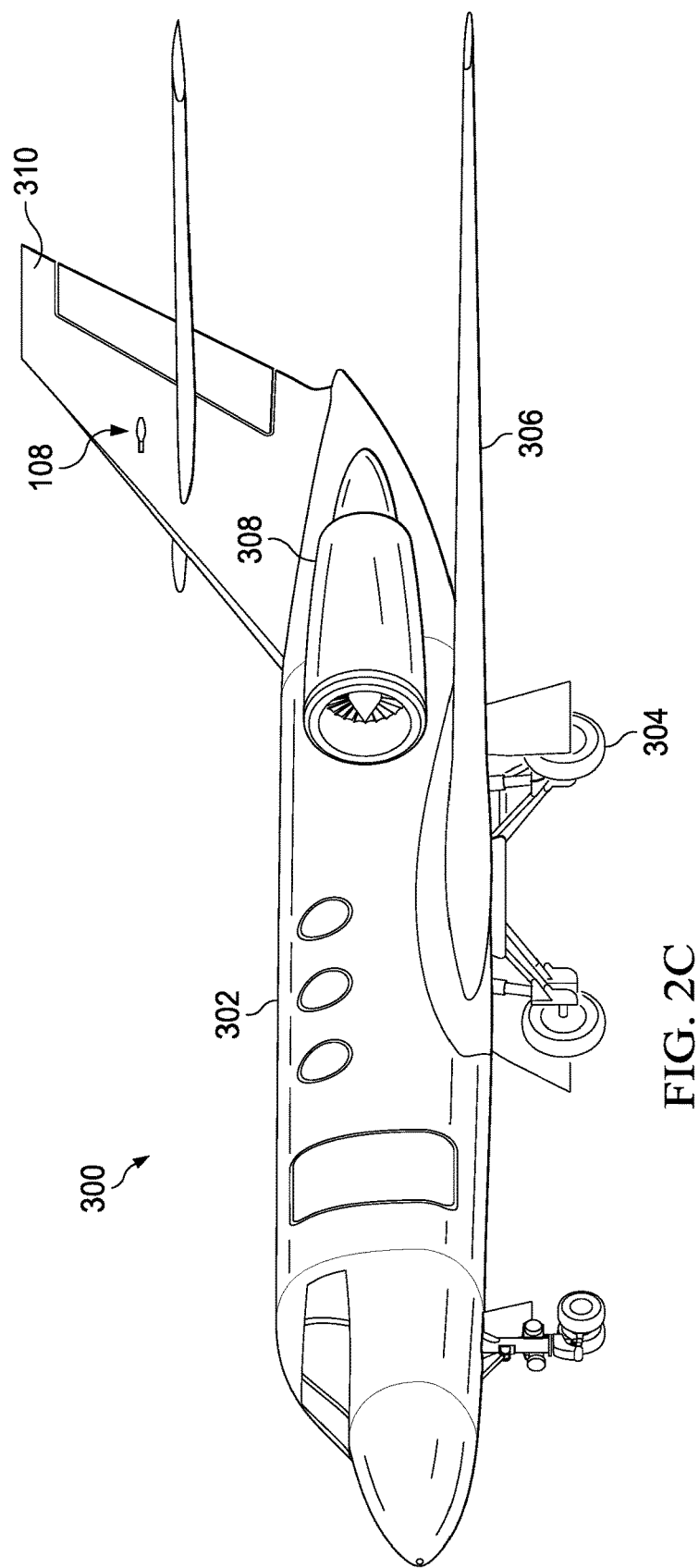
FIG. 2C shows a fixed-wing aircraft that can use the present invention.

FIG. 2C shows a fixed-wing aircraft 300. Aircraft 300 is a fixed-wing airplane that features a fuselage 302, a landing gear 304, a wing 306, and an engine 308. One or more engines 308 may propel aircraft 300 through the air by generating forward thrust. A Pitot 108 is depicted on the vertical stabilizer 310.

Figure 3:
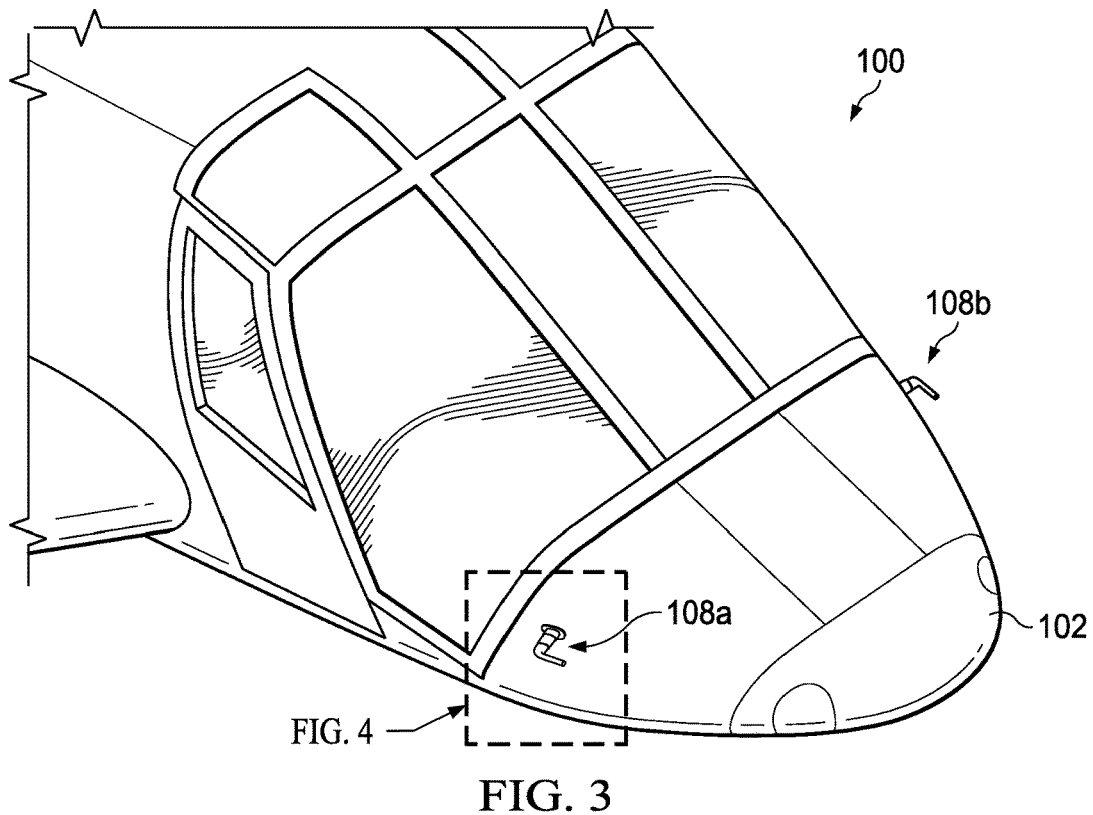
FIG. 3 shows an isometric view of a common position for a Pitot for use with the present invention.

FIG. 3 shows an isometric view of a common position for a Pitot mount 108 for use with the present invention. Aircraft 100 is a tiltrotor 200 having a fuselage 102, and Pitot mount 108a and 108b are depicted in one common position for the Pitot mount 108a, 108b.

Figure 4:
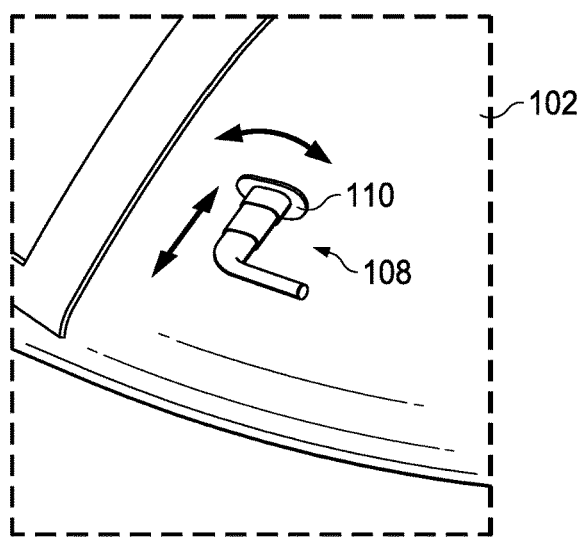
FIG. 4 is a close-up view of the Pitot of the present invention.

FIG. 4 is a close-up view of the Pitot 108 of the present invention, showing its position on the fuselage 102 of the tiltrotor 200, but further showing the range of movement in a first axis around the mount 110 and into or away from the fuselage 102.

The present invention is an adjustable Pitot mount for various situations. The design of the linkages and actuators to power the Pitot mount is exemplary, as the skilled artisan will recognize that a variety of linkages and actuators may be used with the present invention. As such, the "actuator" boxes show the directions that must be manipulated to move the mount. Non-limiting examples of actuators for use with the present invention include, e.g., linear actuators, bell cranks, or a geared system.

Figure 5:
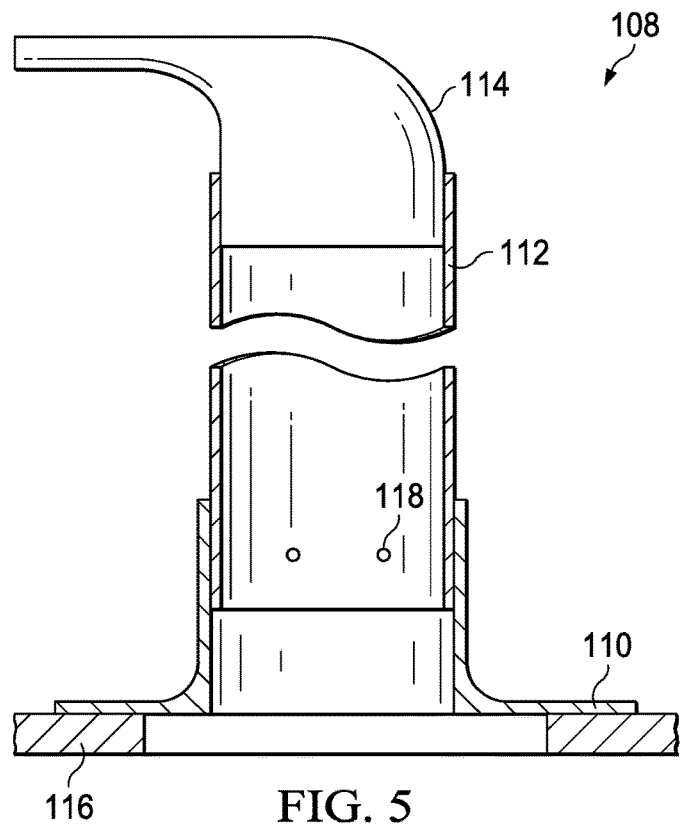
FIG. 5 shows a cross-sectional side view of a 2 Degree of Freedom (DOF) manually adjust Pitot mount of the present invention.
Figure 6:
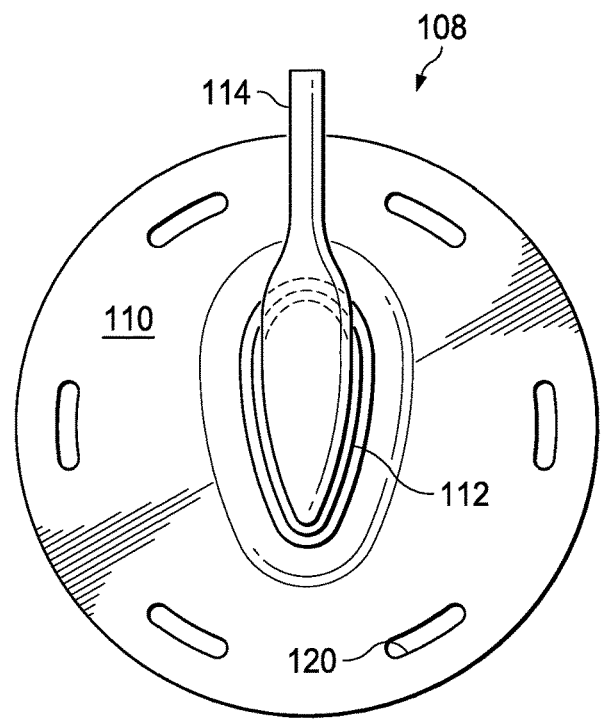
FIG. 6 shows a top view of the Pitot mount shown in FIG. 5, which also includes a 2 Degree of Freedom (DOF) manually adjust Pitot mount of the present invention.

The Pitot of the present invention provides for the first time the ability to reposition the Pitot (or Pitot-static) probe. In certain embodiments, the Pitot of the present invention may be adjusted manually, for example, a manually adjustable Pitot probe for a flight test application. FIGS. 5 and 6 shows a Pitot probe using a 2-DOF adjustable mount. FIG. 5 shows a cross-sectional side view of a two (2) Degree of Freedom (2-DOF) manually adjustable Pitot mount 108 of the present invention. The Pitot mount 110 is shown fastened to fuselage skin 116. A streamline tube 112 (which can be cut to a desired length) is connected to the mount 110 and a Pitot probe 114 is attached to the streamline tube 112. In this embodiment, fasteners 118, such as rivets, can be used to permanently attach the streamline tube 112 to the mount 110.

FIG. 6 shows a top view of the Pitot mount shown in FIG. 5, which also includes a 2-DOF manually adjustable Pitot mount 108 of the present invention. The Pitot probe 114 and streamline tube 112 are connected to the mount 110. In this embodiment, the mount 110 includes slotted fastener holes 120, which permit rotation of the mount 110 and thus the direction of the Pitot probe 114 in relation to the front of the aircraft, and thus the air flow. This allows for manual adjustment of the position of the Pitot/Pitot-static probe during the flight test phase of a program to determine and fine tune the optimal position. The manually adjustable Pitot probe speeds-up the time required to calibrate the air data system saving cost and schedule during flight test. This configuration allows for both linear translation of the probe as well as rotation about the line of translation.

Figure 7:
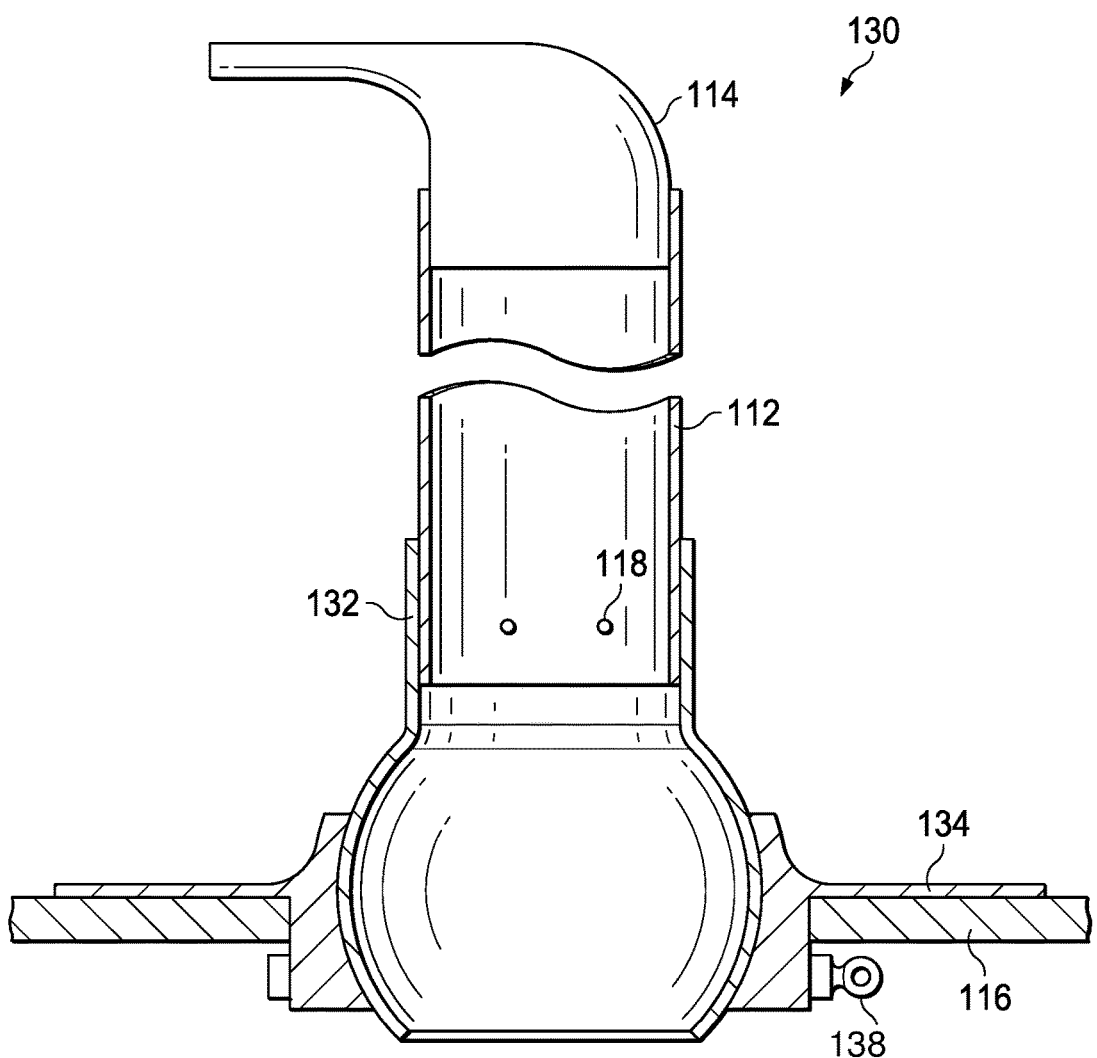
FIG. 7 shows a cross-sectional side view of a multi-DOF manual configuration of the present invention.

Manual adjustment of Pitot probe for a flight test application. Using a multi-DOF adjustable mount (see FIGS. 7 and 8). FIG. 7 shows a cross-sectional side view of a multi-DOF manual Pitot 130 configuration of the present invention. As with the prior version, the multi-DOF manual Pitot 130 includes a Pitot probe 114 connected to a streamline tube 112 show in relation to the fuselage skin 116. The streamline tube 112 is connected to a spherical streamline base 132, which is positioned on a spherical mounting plate 134 (which can be a one or two-piece spherical mounting plate), which allows for manual adjustment until the user tightens a clamp 138, in this version depicted on the spherical mounting plate 134.

Figure 8:
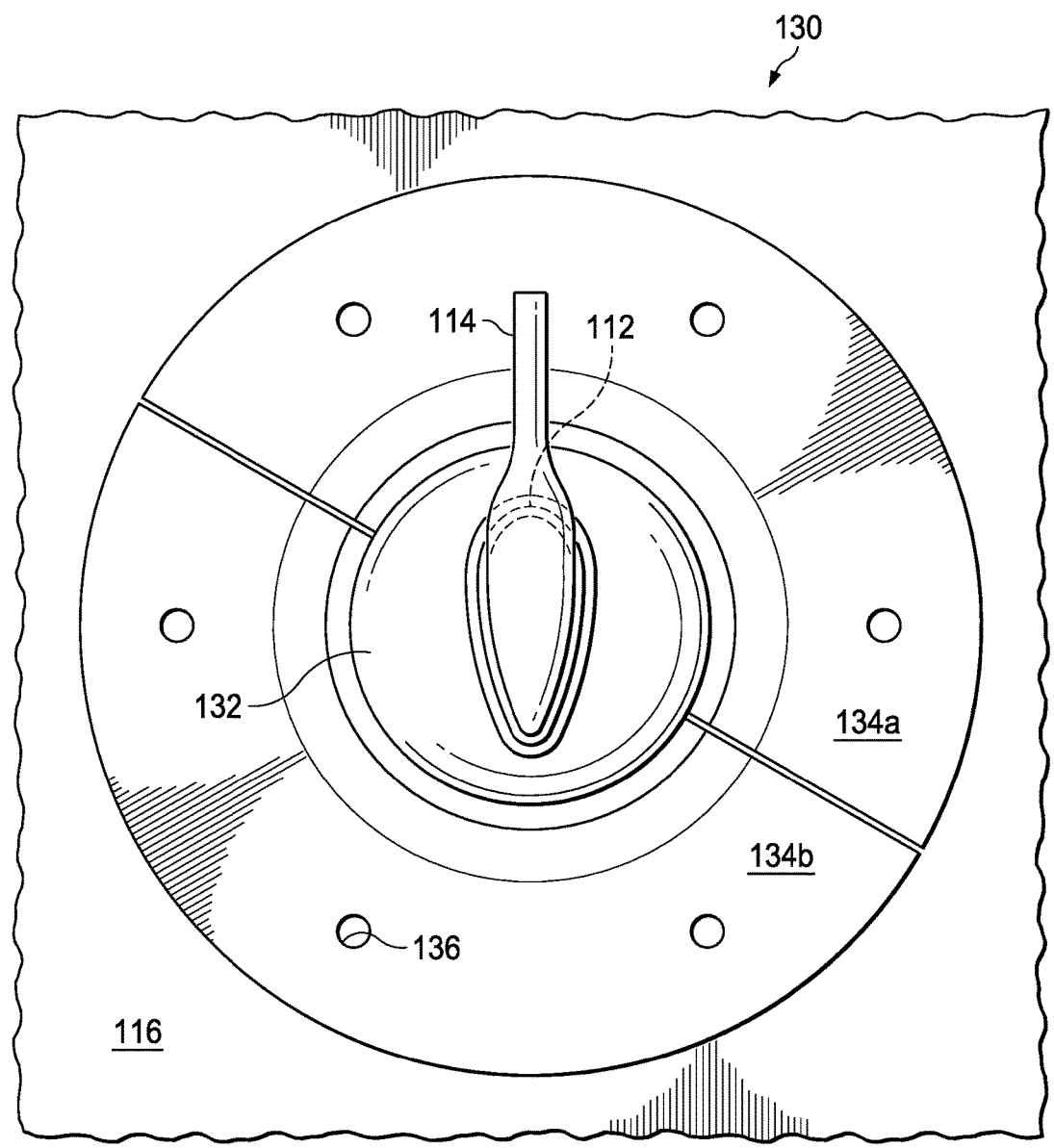
FIG. 8 shows a top view of the Pitot mount shown in FIG. 7, which also includes a multi-DOF manual configuration of the present invention.

FIG. 8 shows a top view of the Pitot mount shown in FIG. 7, which also includes a multi-DOF manual Pitot 130 configuration of the present invention. The Pitot probe 114 and streamline tube 112 are connected to the spherical streamline base 132. In this embodiment, the spherical streamline base 132 is shown between a two-piece spherical mounting plates 134a, 134b, which can be attached to the fuselage skin 116 via fastener holes 136. The multi-DOF manual Pitot 130 configuration permits rotation of the Pitot probe 114, streamline tube 112 and spherical streamline base 132 in multi-DOF, and thus the direction of the Pitot probe 114 in relation to the front of the aircraft, and thus the air flow. The multi-DOF manual Pitot 130 configuration allows for manual adjustment of the position of the Pitot/Pitot-static probe during the flight test phase of a program to determine and fine-tune the optimal position. This version also speeds-up the time required to calibrate the air data system saving cost and schedule during flight test. This configuration allows for linear translation of the probe as well as rotation in all directions via a spherical joint at the base.

The multi-DOF Pitot 130 configuration can also be automated, with adjustment of Pitot probe for flight test application using the multi-DOF adjustable mount. For example, during flight test, there is typically an additional air data sensor on an extended arm forward of the aircraft to give the "true" air data. The data from the Pitot probe on the automated adjustable mount can then be compared to the data from the "true" data. Real-time adjustments could be made to the Pitot position (either via a computer program or by a controller operated by a flight test engineer) such that an optimum position is found. Once this optimum position is found and document, a less expensive fixed mount could be used in that orientation on the production aircraft.

Figure 9:
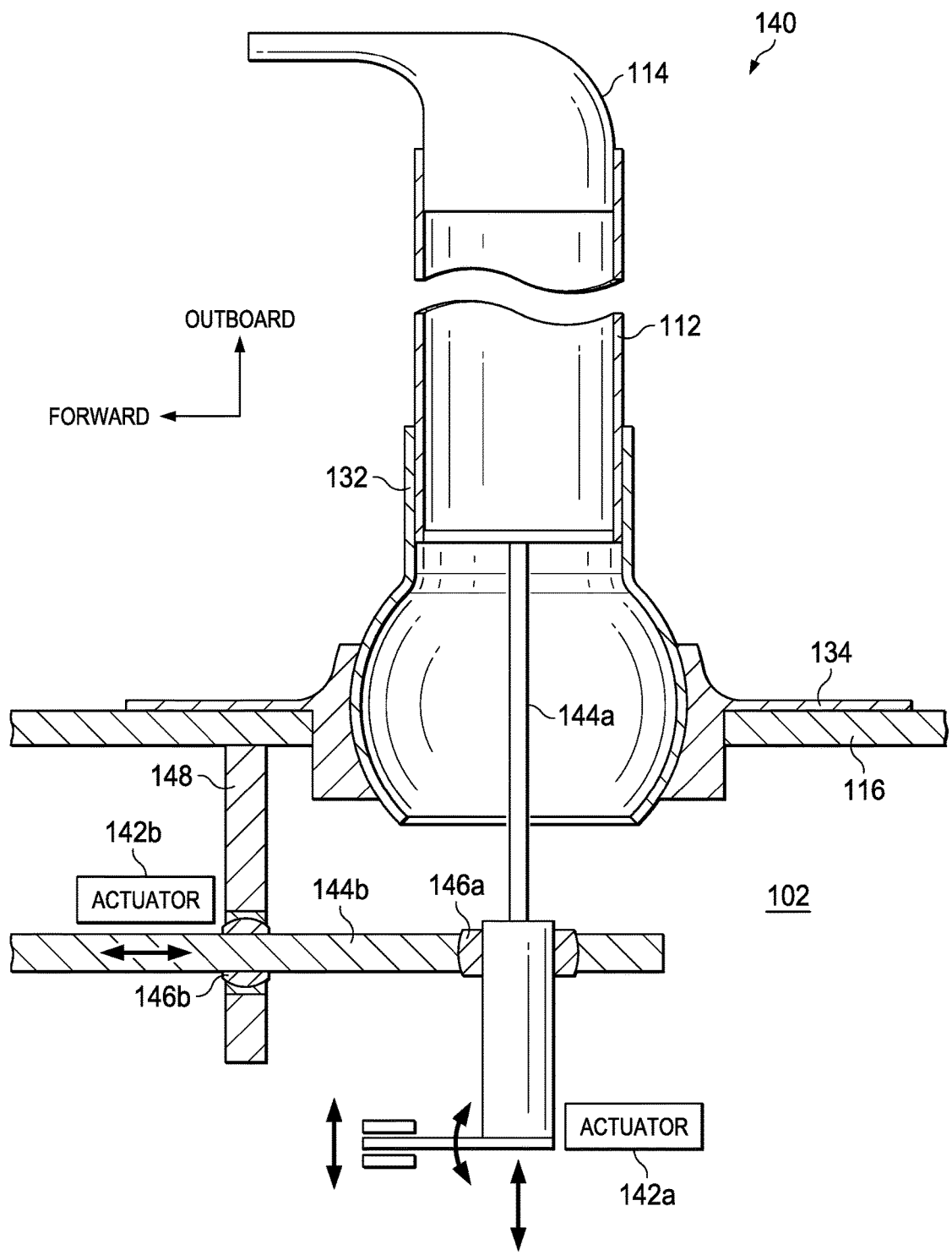
FIG. 9 shows a cross-sectional side view of another multi-DOF automated configuration of the present invention.

Automated adjustment of Pitot probe for production aircraft. Using an automated multi-DOF adjustable mount (see FIGS. 9 to 12). This allows for automatic adjustment of the Pitot probe to constantly find the optimal position to reduce error in the air data system. FIG. 9 shows a cross-sectional side view of another multi-DOF automated Pitot 140 configuration of the present invention. As with the prior version, the multi-DOF automated Pitot 140 includes a Pitot probe 114 connected to streamline tube 112, which is connected to a spherical-streamline base 132 in a spherical mounting plate 134, which is connected to the fuselage skin 116. The multi-DOF automated Pitot 140 includes two actuators 142a, 142b. Actuator 142a is connected to the streamline tube 112 via connector 144a for translating the streamline tube 112 into and away from the fuselage 102. The actuator 142a can also cause rotation of the streamline tube 112 via about the axis of the connector 144a, which would move the tip of the Pitot probe 114 up and down in relation to the front of the aircraft. By translating the streamline tube 112 into and away from the fuselage 102, the tip of the Pitot probe 114 is moved closer to, and away from, the fuselage 102 of the aircraft 100, rotorcraft 200, or fixed wing aircraft 300. Actuator 142b is connected via connector 144a to the streamline tube 112, across a spherical joint 146a, which may also be connected to a second spherical joint 146b via connector 144b, which is actuated by actuator 142b. The actuator 142b may be affixed to the fuselage skin with a fixed connector 148.

Figure 10:
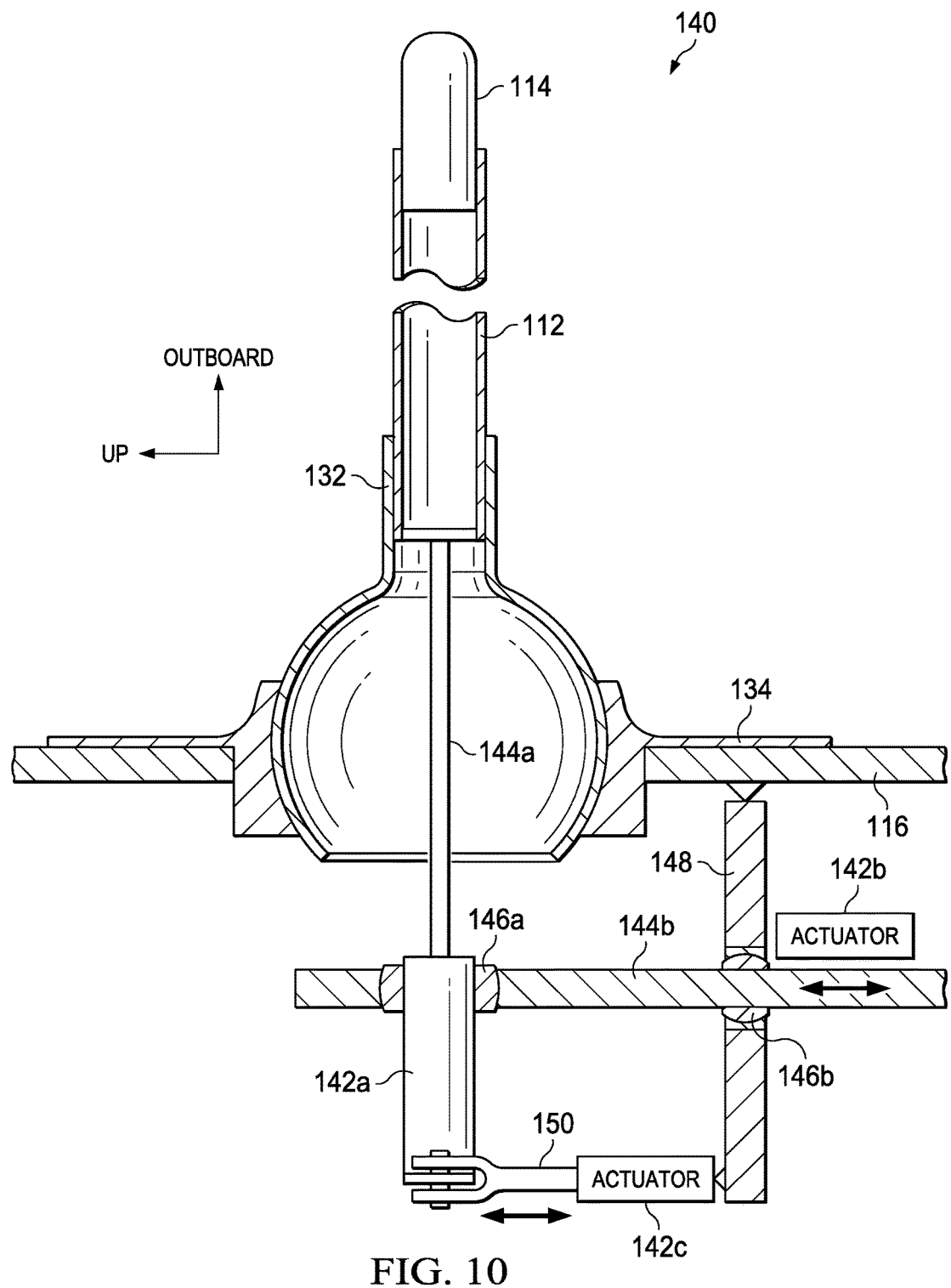
FIG. 10 is a cross-sectional view at a 90-degree angle from the view of FIG. 9, and shows the multi-DOF automated configuration of the present invention.

FIG. 10 is a cross-sectional, forward view at a 90-degree angle from the view of FIG. 9, and shows the multi-DOF automated Pitot 140 configuration of the present invention. The view is as indicated looking from the aft portion of the aircraft looking forward. The Pitot probe 114 is connected to the streamline tube 112, which is slidably engaged in spherical streamline base 132, which is held in place by spherical mounting plate 134. This version shows the same configuration of the actuators 142a and 142b, but also actuator 142c. Actuator 142a is connected to the streamline tube 112 via connector 144a for translating the streamline tube 112 into and away from the fuselage 102. The actuator 142a can also cause rotation of the streamline tube 112 via about the axis of the connector 144a, which would move the tip of the Pitot probe 114 up and down in relation to the front of the aircraft. By translating the streamline tube 112 into and away from the fuselage 102, the tip of the Pitot probe 114 is moved closer to, and away from, the fuselage 102 of the aircraft 100, rotorcraft 200, or fixed-wing aircraft 300. Actuator 142b, is connected to either the actuator 142a, or the connector 144a, via a spherical joint 146a, which may also be connected to a second spherical joint 146b. Actuator 142b is connected via connector 144a to the streamline tube 112, across a spherical joint 146a, which may also be connected to a second spherical joint 146b via connector 144b, which is actuated by actuator 142b. The actuator 142b may be affixed to the fuselage skin with a fixed connector 148. Actuator 142c is connected via fork 150 to the actuator 142a, and at the other end to fixed connector 148, which extends beyond connector 144b and actuator 142b.

Figure 11:
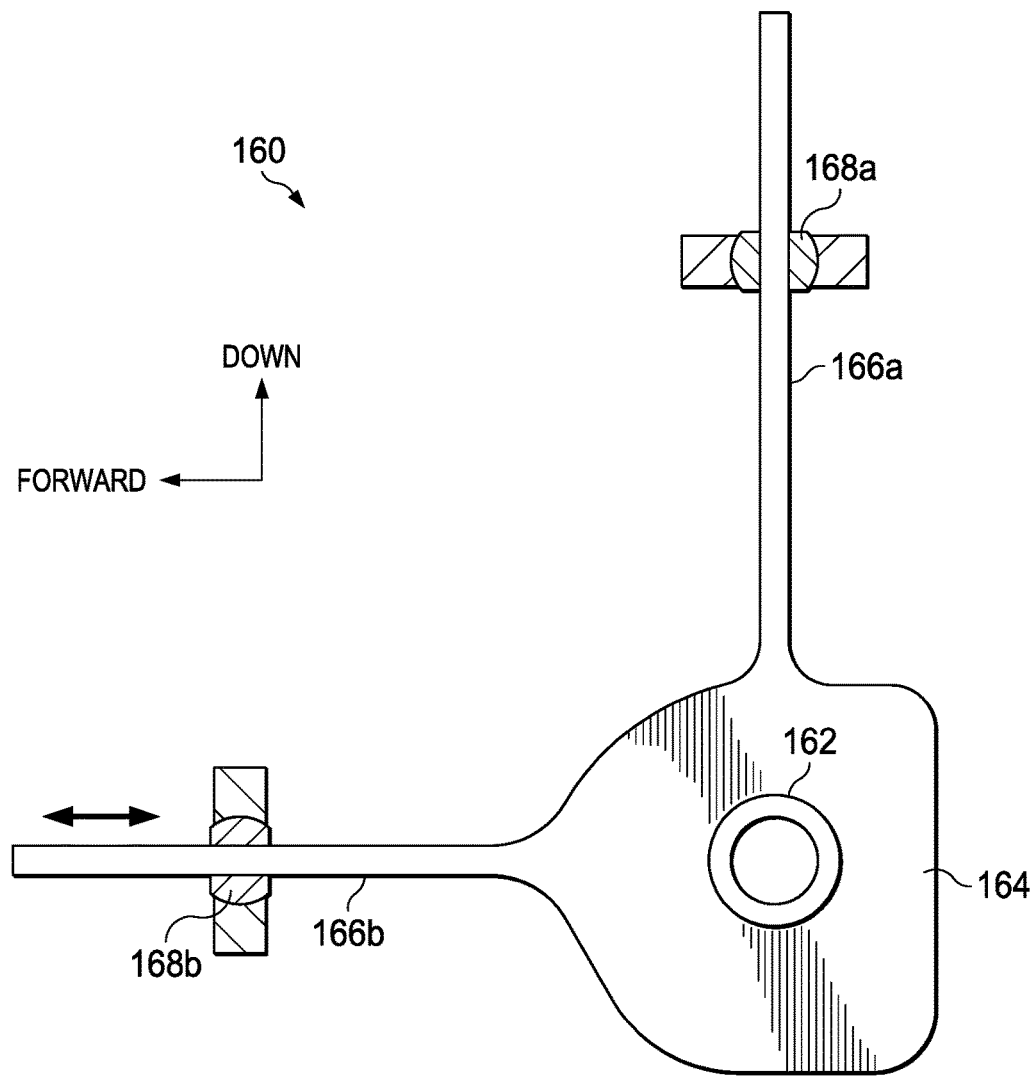
FIG. 11 is a close-up view of the actuator mechanism shown in FIG. 10.

FIG. 11 is a close-up view of the actuator mechanism shown in FIG. 10. The actuator mechanism 160 is shown having a central spherical bearing 162, connected to (or surrounded by) a spherical bearing housing 164. Arms 166a and 166b extend from the spherical bearing housing 164, to joints 168a and 168b, depicted in relation forward and down from the aircraft.

Figure 12:
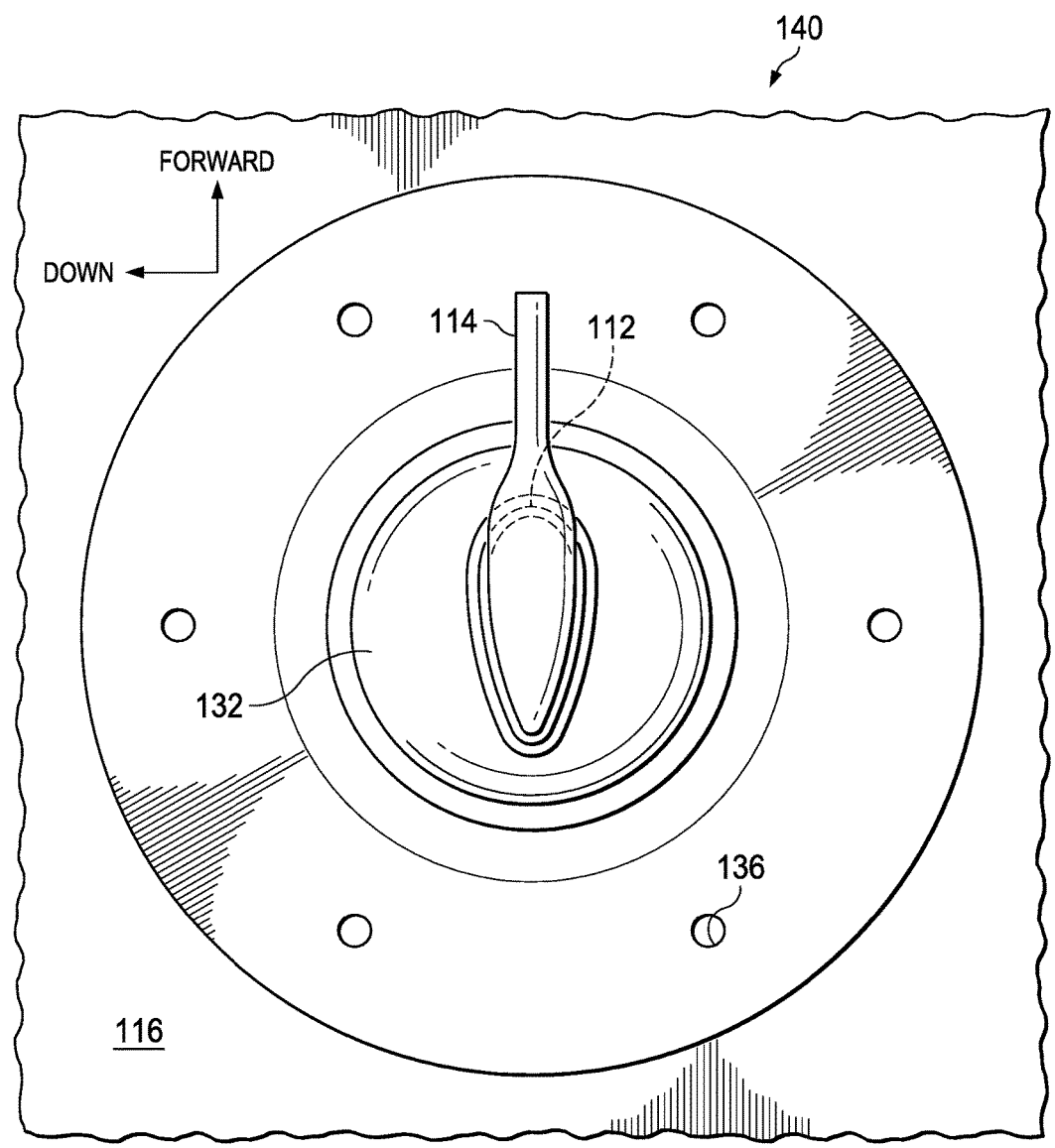
FIG. 12 shows a top view of the Pitot mount shown in FIG. 9.

FIG. 12 shows a top view of the Pitot mount shown in FIG. 9, which also includes a multi-DOF automated Pitot 140 configuration of the present invention. The Pitot probe 114 and streamline tube 112 are connected to the spherical streamline base 132. In this embodiment, the spherical streamline base 132 is attached to the fuselage skin 116 via fastener holes 136. The multi-DOF automated Pitot 140 configuration permits rotation of the Pitot probe 114, streamline tube 112 and spherical streamline base 132 in multi-DOF, and thus the direction of the Pitot probe 114 in relation to the front of the aircraft, and thus the air flow. The multi-DOF automated Pitot 140 configuration allows for automatic- or computer-controlled adjustment of the position of the Pitot/Pitot-static probe during the flight test phase of a program to determine and fine-tune the optimal position. This version also reduces the time required to calibrate the air data system saving cost and schedule during flight test. This configuration allows for linear translation of the probe as well as rotation in all directions via a spherical joint at the base.

The automated or computer multi-DOF automated Pitot 140 can be programmed into both the air data system as well as computers responsible for aircraft orientation. Using the aircraft's angle of attack and side slip, the tip of the Pitot probe will orient itself (via translations and rotations) to the optimal position. This would be particularly useful in helicopter/tiltrotor applications for high angle of attack climb and descent conditions and would also have its place in the fixed winged market for both commercial and private aircraft.

The Automated adjustment of Pitot probe for production aircraft can also be an "active control" application. Using an automated multi-DOF adjustable mount (FIGS. 9 to 12), the probe can be programmed into the aircraft computer system, as well be built into aircraft "active control", meaning, able to re-adjust due to real time aircraft condition with little, if any, input from the pilot who may be focused otherwise. Of course, the pilot may also have an override that prevents any adjustments without pilot input or authorization. For example, if a bird strikes the nose panel of an aircraft and the damaged panel is obstructing the air of one or multiple Pitot probes. The probe would be able to detect this condition and relocate itself to a more optimal position.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An adjustable Pitot tube for an aircraft comprising: a Pitot probe; a streamline tube connected to the Pitot probe; a mount on the aircraft connected to the streamline tube, wherein the streamline tube can rotate about an axis of the mount, or the streamline tube can move the Pitot probe closer to, or away from, a skin of the aircraft, wherein a position of the Pitot tube in at least two or three- dimensions is controlled manually or automatically, wherein the position of the Pitot tube in at least two dimensions is controlled by a computer that is connected to one or more actuators that rotate the streamline tube about its longitudinal axis, or linearly translates the streamline tube along its longitudinal axis.

2. The Pitot tube of claim 1, wherein the Pitot probe is a simple Pitot tube, a static source, or a Pitot-static tube.

3. The Pitot tube of claim 1, wherein the mount comprises a plurality of openings that permit rotation of the mount along a longitudinal axis of the streamline tube.

4. The Pitot tube of claim 1, wherein the mount comprises a spherical mount that permits movement of the streamline tube in at least two-dimensions.

5. The Pitot tube of claim 1, wherein the streamline tube is connected to an actuator that is capable of linearly translating the streamline tube along a longitudinal axis of the streamline tube.

6. The Pitot tube of claim 1, wherein the mount comprises a spherical mount that is connected to one or more actuators, wherein each of the one or more actuators provides rotational of the spherical mount in at least one dimension.

7. The Pitot tube of claim 1, wherein the Pitot tube further comprises a heater or a coating that prevents ice formation.

8. The Pitot tube of claim 1, wherein the position of the Pitot tube in at least three dimensions is controlled by a computer that is connected to two or more actuators that rotate the streamline tube about its longitudinal axis, linearly translates the streamline tube along its longitudinal axis, or change the angle the Pitot tube relative to a surface of the aircraft.

9. The Pitot tube of claim 1, wherein the aircraft is a fixed-wing aircraft, a helicopter or a rotorcraft.

10. A method of positioning a Pitot tube comprising:
connecting a Pitot probe to an adjustable streamline tube; and
mounting the streamline tube to a mount on an aircraft, wherein the streamline tube can at least one of rotate about an axis of the mount, or the streamline tube can move the Pitot probe closer to, or away from, a skin of the aircraft; and controlling a position of the Pitot tube in at least two or three-dimensions manually or automatically.

11. The method of claim 10, wherein the mount is a two degrees of freedom adjustable mount and manually adjusting the rotation or linear position of the streamline tube in relation to the aircraft.

12. The method of claim 10, further comprising the step of manually adjusting the position of a Pitot tube or the Pitot probe in two degrees of freedom during a flight test phase of a program to determine and fine tune the optimal position for the Pitot tube.

13. The method of claim 10, wherein the mount is a multiple-degrees of freedom adjustable mount and manually adjusting the rotation or linear position of the streamline tube in relation to the aircraft.

14. The method of claim 10, further comprising the step of manually adjusting the position of a Pitot tube or the Pitot probe in multi-degrees of freedom during a flight test phase of a program to determine and fine tune the optimal position for the Pitot tube.

15. The method of claim 10, wherein the mount is a multi-degrees of freedom adjustable mount and automatically adjusting the rotation or linear position of the streamline tube in relation to the aircraft.

16. The method of claim 10, further comprising the step of automatically adjusting the position of the Pitot tube or the Pitot probe in multi-degrees of freedom during a flight test phase of a program to determine and fine tune the optimal position for the Pitot tube.

17. The method of claim 10, wherein the mount is a multi-degrees of freedom adjustable mount is connected to two or more actuators that are connected to a computer, wherein the computer automatically adjusts the angle, rotation, or linear position of the streamline tube in relation to the aircraft in real time during aircraft operations.

18. The method of claim 10, further comprising the step of automatically adjusting the position of a Pitot tube or the Pitot probe in multi-degrees of freedom using two or more actuators connected to a computer, wherein the computer changes the angle, rotation, or linear position for the Pitot tube in real time during aircraft operations.

19. An adjustable Pitot tube for an aircraft comprising:
a Pitot probe;
a streamline tube connected to the Pitot probe;
a mount on the aircraft connected to the streamline tube;
one or more actuators connected to the streamline tube or the mount, wherein the streamline tube and/or the mount can: rotate about an axis of the mount, or the streamline tube can move the Pitot probe closer to, or away from, a skin of the aircraft using the one or more actuators, wherein a position of the Pitot tube in at least two or three-dimensions is controlled manually or automatically.

* * * * *